(No Model.)
C. A. BEACH.
TRAMWAY SWITCH.
No. 450,607. Patented Apr. 21, 1891.
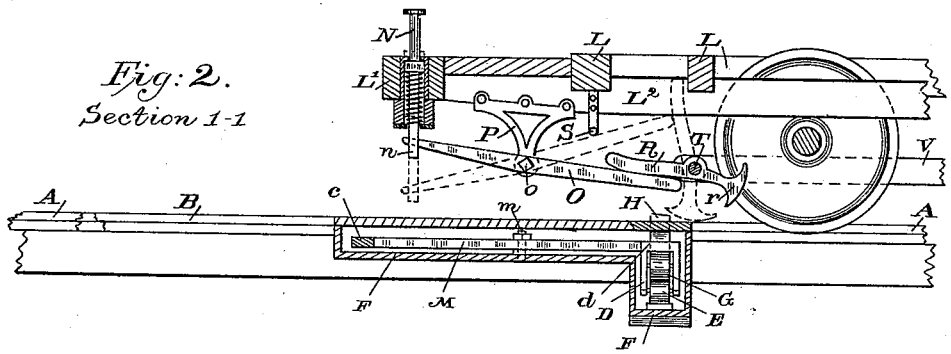
Fig: 2.
Section 1-1
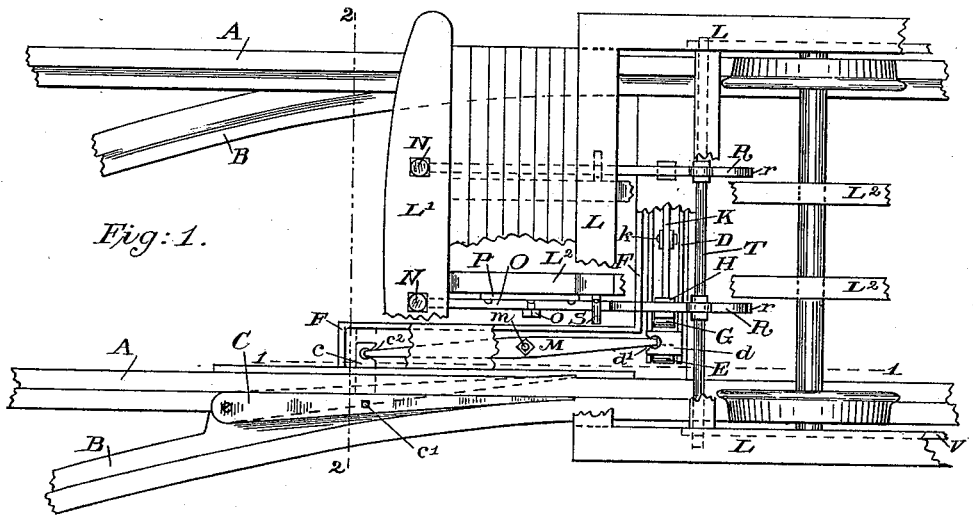
Fig: 1.
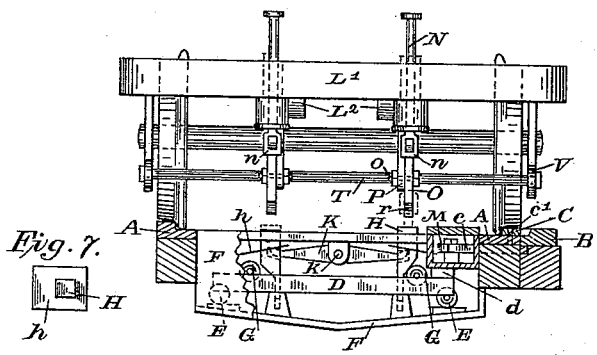
Fig: 3. Section 2-2.
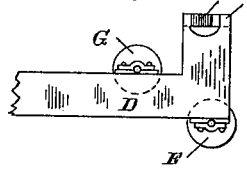
Fig: 4.
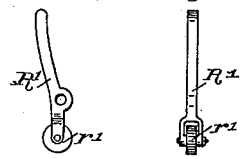
Fig: 5. Fig: 6.
WITNESSES:
John W. Fisher
William Kirk
INVENTOR,
Charles A. Beach
BY
Robert W. Hardie
ATTORNEY.

UNITED STATES PATENT OFFICE.

CHARLES A. BEACH, OF ALBANY, NEW YORK.

TRAMWAY-SWITCH.

SPECIFICATION forming part of Letters Patent No. 450,607, dated April 21, 1891.

Application filed August 11, 1890. Serial No. 361,751. (No model.)

*To all whom it may concern:*

Be it known that I, CHARLES A. BEACH, a citizen of the United States, residing at Albany, in the county of Albany and State of New York, have invented certain new and useful Improvements in Tramway-Switches; and I do hereby declare the following to be a full, clear, and exact description of the invention, such as will enable others skilled in the art to which it appertains to make and use the same.

The object of my invention is to provide suitable means by which a tramway-switch may be readily operated from the platform of a car while the car is in motion, and also to provide means for protecting the parts from dirt and other foreign matter. These objects I accomplish by the devices illustrated in the accompanying drawings, in which—

Figure 1 is a sectional plan view of my invention applied to a car and street-railway tracks. Fig. 2 is a sectional side view of the parts shown in Fig. 1. Fig. 3 is a vertical cross-section taken on line 2 2 of Fig. 1. Fig. 4 is a side elevation of the end of a shifting-carriage. Fig. 5 is a side view of a modification of trip-lever. Fig. 6 is a front view of the same, and Fig. 7 is a plan view of a dirt-protecting flange applied to one of the shifting blocks.

As represented in the drawings, A represents the main track; B, a branch track, and C a switch-block pivoted at its rear end in line with the main track and movable at its forward end, so as to be adjusted to form a continuation of the main track or as a guide to direct the car onto the branch track B.

D represents a carriage inclosed in a casing F and arranged transversely to the main track below the rails. The carriage is mounted on casters E, which permit the carriage to move easily in the direction of its length. The ends $d$ of the carriage are turned upward and outward and provided with sockets $d'$.

The carriage D is provided on its upper edge with casters G, which bear against the inclined edge of the shifting blocks H. These shifting blocks move vertically in guides formed by openings in the upper surface of the casing F. The inner edges of the shifting blocks are provided with sockets, with which the ends of the bar K engage. The bar K is pivotally supported at its center by means of the pin $k$. When one of the shifting blocks H is depressed, its beveled edge presses against the caster G and moves the carriage lengthwise and presses downward the end of the bar K, which engages with the descending block, at the same time raising the other end of the bar K and its engaging shifting block.

A bar M, mounted on a pivot $m$, is arranged close to one of the main tracks in a line substantially parallel therewith and is inclosed within the casing F. The forward end of said bar is connected with the switch-block C by means of the link $c$, provided with a socket $c^2$ at one end, with which the end of the bar engages, and secured at its other end to the switch-block C by means of the bolt or pin $c'$. The rear end of said bar engages with the socket $d'$, formed in the upturned end of the carriage D. When the carriage is moved longitudinally by one of the shifting blocks H, the rear end of the bar M is moved in the same direction as the carriage, and thereby causes a simultaneous movement of the free end of the switch-block C in an opposite direction. When the carriage is shifted to the right the switch-block C is in the position represented by dotted lines in Fig. 1; but when the carriage is shifted to the left the switch-block assumes the position shown by full lines in said figure. N represents two vertical presser-bars movable in suitable boxes or guides formed in the end of the car-frame. A bar O is secured by means of a pivot-pin $o$ to a hanger P, attached to the car-frame. The forward end of said bar is in contact or engagement with the lower extremity of the presser-bar N and its rear end is in contact with the upper arm of the trip-lever R. A stop S is secured to the under side of the car-frame to limit the upward movement of the rear end of the bar O.

The trip-lever R is journaled upon the shaft T, and the lower end of the lever is preferably curved, so as to form a shoe $r$. The upper end of the bar inclines forward slightly and is made heavier than the lower end, so that when not in use it will drop downward without the use of springs or other auxiliary mechanism and assume the position shown by full lines in Fig. 2. When the bar N is depressed by the operator, it carries downward with it the forward end of the bar O and raises the rear end of said bar and also the upper end of the trip-lever R, which is in contact with the rear end of the bar O. The lower end or shoe $r$ of the trip-lever will then be in the position indicated by the dotted lines in Fig. 1. The rear end of the bar O will also then be in the position indicated by dotted lines in said figure, and serve as a brace to hold the lever R firmly in position. When the lever R is in the position indicated by the said dotted lines and the shoe $r$ comes in contact with the projecting end of the shifting block H, said block is depressed by the shoe $r$, thereby causing a simultaneous shifting of the carriage D and switch-block C, as before described. When the pressure of the operator is released from the bar N, the rear end of the bar O drops downward of its own weight, and the upper end of the trip-lever R drops forward, and thereby raises the lower curved end or shoe $r$ out of contact with any obstacle which may be in its path.

The trip-lever may be modified, if desired, without departing from my invention, and in some instances I prefer to dispense with the curved shoe $r$ and provide the lower end of the lever with a caster $r'$.

The shifting blocks H may be provided with a flange $h$, (shown in Fig. 7,) which is inclined slightly, so as to lead off from the working parts any dirt that may find its way into the casing through the openings or guides in which the blocks H move. The carriage D and switch-block C are inclosed within a casing F, which prevents dirt and other matter from interfering with the working of the parts. This casing consists of a simple box of metal, having top, bottom, and side plates.

What I claim is—

1. In a switch-operating device, the combination, with a car-frame, of a longitudinal bar pivotally secured to the car-frame at a point forward of the center of gravity of said bar, a vertically-movable presser-bar, and a trip-lever pivoted to the car-frame at a point below the center of gravity of said lever, whereby the rear end of the longitudinal bar and the upper end of the trip-lever are adapted to drop downward automatically, substantially as shown and described.

2. In a switch-operating device, the combination, with a car-frame, of a longitudinal bar pivoted to the car-frame at a point forward of the center of gravity of the bar, a vertically-movable presser-bar, and a trip-lever pivoted to the car-frame at a point below the center of gravity of said lever, the upper end of said lever being inclined forward and the lower end provided with a curved shoe, substantially as described, for the purpose specified.

3. In a switch-operating device, the combination, with the casing F, of the movable carriage D, provided with the anti-friction wheels E and G, the centrally-pivoted bar K, secured to the upper plate of the casing F, and the shifting blocks H, movable in straight lines in bearing formed in the upper plate of the casing and provided with inclined edges, the inner edges of the blocks having a socket or recess engaging with the end of the bar K, substantially as described, for the purpose specified.

In testimony whereof I affix my signature in presence of two witnesses.

CHARLES A. BEACH.

Witnesses:
ROBERT W. HARDIE,
EDWIN G. DAY.